United States Patent Office 3,514,432
Patented May 26, 1970

3,514,432
POST OXIDATION OF CARBOXY-TERMINATED POLYISOOLEFINS
Gilbert W. Burton, Elizabeth, N.J., assignor to Esso Research and Engineering Company, a corporation of Delaware
No Drawing. Filed Oct. 13, 1967, Ser. No. 675,061
Int. Cl. C08f 27/22, 27/24
U.S. Cl. 260—85.3      10 Claims

ABSTRACT OF THE DISCLOSURE

Carboxy-terminated polyiso-olefins which have been prepared by ozonolysis in the presence of a pyridine followed by storage or heating in the presence or absence of the pyridine are subjected to a post oxidation step following the heating or storage step to increase the carboxyl functionality.

BACKGROUND

This invention relates to a method for increasing the carboxyl functionality of a carboxy-terminated polyisoolefin.

In Ser. No. 603,839, filed Dec. 22, 1966, there is described a method for preparing carboxy-terminated polymers suitable for the preparation of mastics by treating butyl rubber, particularly that prepared from isobutylene and piperylene with ozone in the presence of pyridine to selectively cleave the double bond and convert any resulting aldehydes into the acids and peracids followed by storage or heat soaking to convert the peracids to carboxylic acid groups. The product thus obtained has a functionality of 1.8 to 2.0 carboxy groups per chain and is generally brown colored.

SUMMARY

In accordance with the present invention it has been found that the functionality of carboxy-terminated polyiso-olefins (CTPIB) can be increased to 2.1 to 2.3, a stronger and more extensible product obtained, and the brown color of the product removed by subjecting the ozonized and heat-treated carboxy-terminated polymer to a post oxidation treatment.

PREFERRED EMBODIMENTS

The preparation of carboxy-terminated polyiso-olefins (CTPIB) is described in detail in Ser. No. 603,839 to Baldwin et al., filed Dec. 22, 1966.

In general such carboxy-terminated polyiso-olefins are prepared by ozonization of a particular type of butyl rubber which is obtained by the copolymerization of a major portion of a monoolefin such as an isoolefin having from 4 to 7 carbon atoms per molecule with a minor proportion of a conjugated diolefin where the second and third carbons of the conjugate system are both substituted only with hydrogen. The most commonly employed isoolefin is isobutylene although other monoolefins such as 3-methyl-1-butene or 4-methyl-1-pentene may also be used. Suitable conjugated diolefins which can be employed as the other component of the reacting mixture include: 1,3-butadiene, 2,4-hexadiene, and piperylene. The conjugated diolefins useful in this invention are those that, on copolymerization with isobutylene yield an unsaturated elastomeric copolymer, the predominant portion of the in-chain unsaturation being the 1,2 substituted ethylene type.

Generally, the feed composition contains between about 60 and 99.5 wt. percent of isoolefin with the remainder being the conjugated diolefin. The polymerization is generally carried out at a low temperature, e.g. between about −50° and −165° C. or lower in the presence of a Friedel-Crafts catalyst such as aluminum tribromide, aluminum trichloride, or the like with the reaction being carried out in a solvent medium such as a lower alkyl halide, for example, methyl chloride or ethyl chloride.

In forming rubbers which may be successfully employed as starting materials according to the instant novel process, the conjugated diolefin reactant must be one corresponding to the following formula:

$$R_1-CH=CH-CH=CH-R_2$$

where $R_1$ and $R_2$ are the same or different substituents selected from the group consisting of hydrogen, a lower alkyl of from 1 to 8 carbon atoms such as methyl, ethyl, propyl, isopropyl, butyl, isobutyl, 2-methyl propyl, 2-ethyl propyl, etc., a phenyl radical or simple alkyl-substituted phenyl radical such as tolyl, xylyl, etc., and a $C_5$ to $C_8$ alicyclic or alkyl-substituted alicyclic radical such as cyclopentyl or cyclohexyl, methyl cyclopentyl, etc. Specific examples of such diolefins which may be used have been described above and include such monomers as butadiene, piperylene, 1,3-hexadiene, and 2,4-hexadiene.

The resulting piperylene or butadiene-iso-olefin copolymer is subjected to treatment in three stages:

(1) Selective cleavage of the double bond of the copolymer by means of ozone in the presence of pyridine to yield carboxylic acid, aldehyde groups, and other partial oxidation products, (2) Oxidation of the resulting aldehyde groups into acids and peracids, (3) Conversion of the peracid groups to carboxylic acid groups and the partially oxidized groups to aldehyde groups by heating or storage.

Thus, the piperylene or butadiene iso-olefin copolymer is dissolved in any suitable solvent to form a cement. Suitable solvents for use in preparing the cement include aliphatic hydrocarbons such as pentane, hexane, heptane, and the like or their chlorinated derivatives. The cement is subjected to ozonolysis at temperatures between −80° C. and +60° C., preferably between −25° C. and +50° C. or even more preferably between −10° and +40° C. and in the presence of pyridine or a substituted pyridine which is added to the cement before the ozonization reaction or stepwise during the reaction. Suitable pyridines include pyridine itself and $C_1$ to $C_{50}$ alkyl substituted pyridenes, quinolines, isoquinolines, pyridine homologs, and the like. Without the use of pyridine, a useful carboxylated product cannot be easily obtained. The pyridine can be used in amounts from .25 to 10 or more moles pyridine per mole olefin present in the polymer cement. Generally, for convenience, the concentration of the rubber in the solvent will range from about 1% to about 30% by volume, preferably between about 10% and about 20% by volume. The pyridine is present in the solvent in a concentration of from about .25 to 50, preferably .5 to 10, and most preferably 1 to 5 moles per mole of ethylenic unsaturation in the rubber molecule.

In the first stage, ozone is present in the gas stream in concentrations of about .1% to 100%, preferably 1 to 10%, and most preferably 1.0 to 6 wt. percent. In the second stage, which may or may not be required, depending on temperature of ozonization, solution concentration, unsaturation of the polymer being ozonized, etc., the most preferable concentrations are .5 to 6 wt. percent. The ozone is contacted with the polymer until unreacted ozone is detected in the off gas. Sodium iodide or potassium iodide solutions and stretched vulcanized natural rubber can be used to detect the breakthrough of unreacted ozone, indicating the end of the first stage. Additional ozone is added in the second stage to oxidize residual aldehyde groups. Ozonolysis in the second stage is carried for a time of about 10 to 500% of the time necessary for the first stage ozonolysis. The time is chosen so as to be sufficient to oxidize the residual aldehyde quantitatively.

Under actual plant conditions, the first stage and second stage are often merged together, but for the purposes of understanding what is believed to be the mechanism of the reaction, the stage concept is important.

During the ozonization, a peracid is formed which must be subsequently reduced to the carboxylic group before a useful product can be obtained. This reduction can be done either by storage or heating to a temperature of 50 to 200° C. The reduction can also be done by treating the peracid with pyridine or with alkyl or aryl amines, phosphines, organic sulfides, thiols, and organic phosphites, or by acid catalyzed reduction with aldehydes. However, pyridine reduction is especially preferred since in many cases it is preferable to the other techniques from a process standpoint. The peracid reducing agent is present in an amount of from 1 to 10 moles of peracid reducing agent per mole of peracid. The time of heating is dependent upon temperature, amount of material, etc. and can be from 1 minute to twenty-four hours.

Generally better results, that is higher functionality, can be obtained if the pyridine is removed during the heating step or subsequent to other methods for reducing the peracids.

The product of ozonolysis followed by oxidation and reduction of the peracids is a brown-colored polymer having terminal carboxy groups, the functionality of which is between 1.8 and 2.0 carboxy groups per chain.

The carboxy-terminated polymer thus obtained is subjected (following the heat-treating or other method for the reduction of the peracids) to reozonization in a manner similar to that carried out originally except that no pyridine is added. As pointed out above aldehyde and acid are formed in the first stage of ozonolysis and aldehyde is oxidized to acid and peracid in the second stage. However, it has now been found that although the proper amount of aldehyde is formed in the first stage and oxidized in the second stage, not enough acid is formed in the first stage. Thus, one mole of unsaturation gives one mole of aldehyde and ca. ½–⅔ mole of acid in the first stage. The remainder of the oxidized material that should be acid forms some other unknown species. This unknown species forms aldehyde functionality upon heating or storage. Thus, in accordance with this invention it has been found necessary to subject the polymer after the heating or storage step to a post-oxidation step to convert all the aldehydes from the third step (heating or storage) to acid groups. Thus the process of this invention encompasses five steps:

(1) Ozonoization of the polymer in the presence of pyridine to yield carboxylic acid, aldehyde and other partially oxidized groups;

(2) Oxidation of the aldehyde groups to acids and peracids;

(3) Conversion of the peracids to carboxylic acid groups and the partially oxidized groups to aldehyde groups by heating or storage in the presence or absence of pyridine;

(4) Post-oxidation of the aldehyde groups from step 3 to carboxylic acid and peracid groups;

(5) Converting the peracid groups from step 4 to carboxylic acid groups.

Heating and further ozonization can be done at any time after double bond cleavage is complete. This ozonization will include some of the aldehyde oxidation previously done immediately after double bond cleavage; nevertheless, full functionality will result. The amount and concentration of oxygen or ozone used is the same as that used in the first step, e.g. 0.1 to 100 wt. percent, preferably 1 to 6 wt. percent. Since it is preferable to reozonize in the complete absence of pyridine, the pyridine must be removed during the heating step or in a subsequent step, as by heating the reduced polymer under vacuum. The time of oxidation will vary depending upon ozone and oxygen rate, the amount of material, etc. It should be continued until the aldehydes have been completely oxidized to acids.

By reoxidizing after converting the peracid groups to acid groups in accordance with the present invention the functionality can be increased to 2.1 to 2.3. This increase in functionality results in much stronger product, particularly when compared at equal weights of curing agent. In a typical case the tensile is increased from 730 p.s.i. to 900 p.s.i. and the elongation from 180% to 220%. This means that the reoxidized material has different properties in vulcanizate systems than does the original material and shows that the reoxidation has contributed network-forming functionality.

Thus the invention involves oxidation after heating as a means of increasing functionality and improving color. (No implication should be made that the product necessarily has to be stripped of solvent and redissolved after heating.) Functionality increase and color improvement has been exemplified by the use of ozone-oxygen as an oxidizing agent. Other oxidizing agents could also be used; for example, ozone alone or reagents such as potassium permanganate, chromic acid, hydrogen peroxide or peracids may be effective. Molecular oxygen or air in the presence or absence of free radical initiators such as ultraviolet light and peroxides, salts of metals such as manganese, cobalt, copper, nickel, etc., could act as oxidizing agents to increase acid functionality and improve color.

The following examples are presented to illustrate the invention in more complete detail.

Example 1

Thirty-three lbs. of piperylene butyl which had an iodine number of 21.4 were dissolved in purified hexane to obtain a solution of 23 wt. percent polymer. Fourteen hundred and fifty-five grams, 3.21 lbs. of pyridine were added to the resulting cement to give a blend containing 9.82 g. pyridine/100 grams of polymer. One hundred and forty-four lbs. of this mixture of pyridine, polymer, and hexane was added to a 30 gallon glass-lined reactor. The mixture was cooled to −20° C. and oxygen containing 2.6 wt. percent $O_3$ was bubbled through the mixture at 9.1 l./min.

During the first stage of ozonization the cement changed from a clear water-white to a purplish opalescent solution. The reaction progress was followed by withdrawing samples of the cement during the run.

On standing, these solutions became semi-opaque and buff-colored and on further standing, a hexane insoluble material settled to the bottom of the container. Ozone was first detected (KI trap) in the gas venting from the reactor after thirty-nine hours of ozone-oxygen addition. To insure complete reaction the ozone-oxygen addition was continued for 4.2 hours, giving a total run length of 43.2 hours. The mixture was stored for thirteen days at room temperature and then was heated to 68° C. for twenty-four hours. After nine hours of heating 500 grams of pyridine were added to insure that all reducible groups (such as peracids) would be reduced.

During this heating period the cement changed from a buff to a dark brown color with a significant amount of hexane insoluble "sludge" being formed. Some of this sludge would settle if the cement was allowed to stand undisturbed.

The ozonized and heat soaked cement was removed from the reactor and treated with a strongly acidic ion exchange resin (Dowex 50 WX–8) to remove the pyridine and its oxidation products. The removal was judged complete when all of the pyridine odor was gone which occurred after adding 30 lbs. of resin and agitating the mixture for forty-five minutes.

During the resin treating of the cement, the cement became lighter in color but enough color remained to give a dark colored product when the hexane was stripped.

The resin was removed by filtering the cement through filter paper. The hexane was stripped from the carboxylated polymer in a mechanically aided thin-film evaporator. The product was dark brown and was free of any insoluble materials.

Example 2

The polymer of Example 1 (50 g.) was dissolved in 300 g. of acid-washed pentane. The solution was kept at 0° C. during ozonization by the use of an ice-salt cooling bath. Ozone was passed in at the rate of 3.0 meq./min. while the oxygen flow rate was 1.5 standard liters per minute. Addition of the ozone-oxygen mixture was discontinued after thirty minutes. Nitrogen was bubbled into the solution for five minutes. The solution (342.3 g.) was divided in half. One-half was heated on a steam bath to remove the solvent and the residue was placed in a vacuum oven at 50° C. and 10 mm. Hg vacuum for two days. Yield 23.8 g. The following data were obtained:

|  | CTPIB | Re-Ozonized CTPIB |
|---|---|---|
| Acid No. (mg. KOH/g.) | 62.5 | 68.7 |
| $M_n$ | 1,800 | 1,960 |
| COOH/mol | 2.0 | 2.3 |
| Color | Dark brown | Off white |

The above data show that a carboxy-terminated polyisobutylene (CTPIB) which has been reozonized after heat soaking has increased in functionality from 2.0 to 2.3 COOH per chain.

Example 3

50 g. of piperylene-isobutylene copolymer (Iodine No. 20), 20 g. of pyridine, and 300 g. of pentane, which had been treated with oleum to remove impurities, were ozonized just until the appearance of ozone in the off-gas (as measured by the formation of iodine in an off-gas trap containing potassium iodide). The ozone rate was 3.0 meq./min., while the oxygen rate was 1.5 liters per minute. The cement was heated on a steam bath to remove the solvent and then heated for four hours at 90° C. in a vacuum oven. The residue was dissolved in pentane, filtered, and divided into two parts. One part was ozonized for thirty minutes and heated to remove the solvent. The residue had an analysis for acid functionality of 1.14 meq./g. with a number average molecular weight of about 1800. The other part which had not been ozonized after heating was heated under vacuum to remove the solvent. The residue had an analysis for acid functionality of 0.494 meq./g. with a number average molecular weight about 1800.

Example 4

A cement was made from 50 g. of a piperylene-isobutylene copolymer (Iodine No. 20), 20 g. of pyridine, and 300 g. of acid-treated pentane. This cement was ozonized at 0° C. (±5° C.) by an ozone-oxygen stream. The ozone rate was 3.0 meq./min. while the oxygen rate was 1.5 l./min. The cement was kept at 0° during the ozonization. Ozone was passed into the mixture for sixty minutes. Ozone was detected in the off-gas after about thirty-two minutes. After ozonization the cement was divided to three parts. Each part was stripped of solvent by heating on a steam bath and the residue was heated under vacuum at 90° C. for 1, 2, or 3 hours. Results are reported in the following table. Similar experiments were also done with lengthened heating times of six and twenty hours. These results are reported in the following table. After the heating period each material was dissolved in pentane and reozonized for thirty minutes at 10–15° C. using the ozone-oxygen rates reported previously. These results are reported in the following table.

| Experiment | Time of heating (hour) | KOH No. at End of Ozonization (a) (Functionality) (b) | | KOH No. After Re-Ozonization (a) (Functionality) (b) | |
|---|---|---|---|---|---|
|  |  | (a) | (b) | (a) | (b) |
| 1 | 1 | 54.5 | 1.7 | 63.5 | 2.0 |
| 2 | 2 | 56.2 | 1.8 | 65.9 | 2.1 |
| 3 | 3 | 56.4 | 1.8 | 66.8 | 2.1 |
| 4 | 6 | 55.4 | 1.8 | 66.5 | 2.1 |
| 5 | 20 | 55.6 | 1.8 | 64.2 | 2.1 |

(a) Mg. KOH/g. of sample.
(b) In units of COOH/chain using $M_N$ of 1,800.

The above data show that heating for one hour at 90° C. followed by reozonization is sufficient to increase functionality in CTPIB.

Example 5

A cement was made from 50 g. of piperylene-isobutylene copolymer, 300 g. of heptane, and 20 g. of pyridine. This cement was ozonized at ca. 0° C. for sixty minutes. The ozone rate was 3.0 meq./min. while the oxygen rate was 1.5 l./min. The cement was then divided into several parts. One part was stripped of solvent on a steam bath and the residue heated for four hours under vacuum. This material was dissolved in pentane, filtered to remove any sludge. One fourth of the solution was stripped of solvent and heated in a vacuum oven. The other three fourths were re-organized for thirty minutes using the ozonization conditions described previously.

The other parts from the original ozonization were heated at 97–100° C. for four and twenty hours. The cements were filtered and part removed. The remaining cement was re-ozonized for thirty minutes using the conditions previous described. The re-ozonized material, as well as the part not re-ozonized, were stripped of solvent and acid numbers taken. In some cases, further re-ozonization was done after heating under vacuum to remove pyridine, to show the maximum obtainable functionality. The data are shown in the following table.

|  | Run | Pyridine removed (heated four hours in vacuum) | Pyridine and heptane cement heated 4 hrs. before re-ozonization | Pyridine and heptane cement heated 20 hrs. before re-ozonization |
|---|---|---|---|---|
| KOH No. before re-ozonization. (a) | 1 | 57.1 | 57.1 | 56.0 |
|  | 2 | 57.0 | 57.9 |  |
| Functionality before re-ozonization. (b) | 1 | 1.8 | 1.8 | 1.8 |
|  | 2 | 1.8 | 1.9 |  |
| KOH No. after re-ozonization. (a) | 1 | 68.9 | 62.8 | 60.4 |
|  | 2 | 67.1 | 63.6 | 62.7 |
| Functionality after re-ozonization. (b) | 1 | 2.2 | 2.0 | 1.9 |
|  | 2 | 2.2 | 2.0 | 2.0 |
| KOH No. of re-Ozonized material after further ozonization. (a) | 1 |  | 65.3 | 64.4 |
|  | 2 |  | 68.7 | 68.5 |
| Functionality of re-ozonized material after further re-ozonization. (b) | 1 |  | 2.1 | 2.1 |
|  | 2 |  | 2.2 | 2.2 |

(a) Mg. KOH/g. of sample.
(b) In units of COOH/chain using $M_N$ of 1,800.

The advantages of the present invention having thus been fully set forth and specific examples of the same given, what is claimed as new and useful and desired to be secured by Letters Patent is:

1. A process for preparing a curable polymeric material which comprises in combination the steps of:
(a) ozonizing a Type II unsaturated rubbery copolymer which has been prepared by copolymerizing from 60 to 99.5 wt. percent of a $C_4$ to $C_7$ isoolefin with from 40 to 0.5 wt. percent of a conjugated diolefin having the general formula:

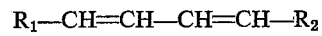

$$R_1-CH=CH-CH=CH-R_2$$

wherein $R_1$ and $R_2$ have been selected from the group consisting of hydrogen, $C_1$ to $C_8$ alkyl, phenyl and $C_5$ to $C_8$ cycloalkyl radicals in the presence of from about .5 to 10 moles of a pyridine per mole of unsaturation:
(b) obtaining as a result of said ozonolysis, polymer fractions having a lower molecular weight than said rubbery copolymer, said fractions possessing peracidic and other partial oxidation functionality and functionality chosen from the group consisting of carboxylic functionality, aldehydic functionality and combinations of the foregoing functionality;
(c) converting the peracidic groups from step (b) to carboxylic acid groups and the partially oxidized groups from step (b) to aldehyde groups by reduction;
(d) converting any aldehyde groups from step (b) and the aldehyde groups from step (c) to acid and peracid groups by contacting the polymer from (c) by oxidation with ozone; and
(e) converting the peracid groups from step (d) to acid groups.

2. A process according to claim 1 wherein said conjugated diolefin is piperylene.

3. A process according to claim 1 wherein said conjugated diolefin is butadiene.

4. A process according to claim 1 wherein said pyridine is unsubstituted pyridine.

5. A process according to claim 1 wherein said first ozonizing step is carried out until the ethylenic linkages have been cleaved but for a time which is insufficient to oxidize all the aldehydic functionality therefore resulting in residual aldehyde groups.

6. A process according to claim 1 wherein said first ozonizing step is carried out until all the ethylenic linkages have been cleaved and all the aldehydic functionality has been oxidized to acid and peracid functionality.

7. Process according to claim 5 wherein said peracid is converted to acid by contacting with 1 to 10 moles of a peracid reducing agent.

8. Process according to claim 7 in which the peracid reducing agent is pyridine.

9. Process according to claim 6 wherein said peracid is converted to acid by contacting with 1 to 10 moles of a peracid reducing agent.

10. Process according to claim 9 in which the peracid reducing agent is pyridine.

References Cited

UNITED STATES PATENTS

| | | | |
|---|---|---|---|
| 2,356,128 | 8/1944 | Thomas et al. | 260—79 |
| 3,234,197 | 2/1966 | Baum | 260—93.7 |
| 3,392,154 | 7/1968 | Baldwin | 260—77.5 |

JOSEPH L. SCHOFER, Primary Examiner

R. A. GAITHER, Assistant Examiner